United States Patent Office 2,931,794
Patented Apr. 5, 1960

2,931,794

COMPLEX METAL COMPOUNDS OF MONOAZO-DYESTUFFS

Bernhard Ruetimeyer, Neu-Allschwil, and Fritz Oesterlein, Basel, Switzerland, assignors to Ciba Limited, Basel, Switzerland, a firm No Drawing. Application August 4, 1958
Serial No. 753,095

Claims priority, application Switzerland August 6, 1957

10 Claims. (Cl. 260—146)

This invention provides new complex metal compounds of monoazo-dyestuffs, which contain one atom of a heavy metal, advantageously chromium or cobalt, bound in complex union to two monoazo-dyestuff molecules, and in which the monoazo-dyestuffs contain, in addition to the groups participating in the complex formation, a single strongly acid group imparting solubility in water and a monohalogen-triazine radical, which, if it contains a salt-forming substituent, contains only one which is strongly ionized, for example, a sulfonic acid group or carboxylic acid group.

The invention provides more especially 1:2-complex-chromium or cobalt compounds of monoazo-dyestuffs of the general formula (1)

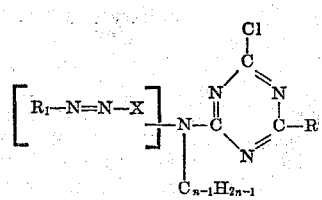

in which $R_1$ represents a benzene radical containing a hydroxyl group in ortho-position to the azo linkage, X represents the radical of a coupling component bound to the azo grouping in vicinal position to a hydroxyl or amino group, $n$ represents the whole number 1, 2 or 3, and R represents an etherified hydroxyl or mercapto group or a substituted amino group, the substituent of which, if it is aromatic, carries at least one sulfonic acid or carboxyl group per aromatic six-membered ring.

As strongly acid groups imparting solubility in water, which are present in the dyestuffs of this invention, there may be mentioned, for example, a carboxylic acid or sulfonic acid group. In addition to a single group of this character the dyestuff may contain further substituents, for example, halogen atoms, alkyl groups of low molecular weight or nitro groups.

In addition to the strongly acid group imparting solubility in water, the metalliferous dyestuffs of this invention contain a halogenated triazine radical, for example, a 2-chloro-4-methyl- or phenyl-1:3:5-triazine radical or preferably a radical of the formula (2)

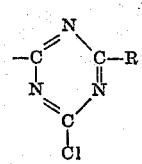

in which R represents an etherified hydroxyl or mercapto group or a substituted amino group, and which triazine radical is advantageously bound to the radical of the diazo or coupling component through an amino group of the formula $$-N-$$
$$\underset{C_{n-1}H_{2n-1}}{|}$$

in which $n$ is a whole number, preferably 1.

For making the complex heavy metal compounds of the invention the appropriate metal-free dyestuff containing a triazine ring as defined above may be treated with an agent yielding chromium or cobalt or advantageously such a triazine radical may be incorporated into the appropriate metalliferous dyestuff containing no halogen-triazine radical. For this purpose in a trihalogen-triazine, especially cyanuric chloride (2:4:6-trichloro-1:3:5-triazine), one halogen atom may be replaced by the radical of a 1:2-complex-chromium or cobalt compound of a monoazo-dyestuff containing an acylatable amino group and a strongly acid group imparting solubility in water, and a further halogen atom is exchanged for the radical of an organic compound having no dyestuff character. Thus, one of the aforesaid metalliferous dyestuffs may be condensed at the acylatable group with cyanuric chloride or with a 2:4-dichloro-1:3:5-triazine containing in the 6-position a free amino group or an organic substituent, for example, a dihalogen-triazine of the formula (3)

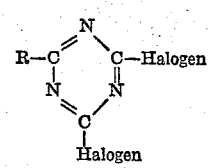

in which R has the meaning given above in connection with Formula 1, the condensation being carried out in such manner that only one of the two halogen atoms is exchanged.

The dihalogen-triazine of the Formula 3 can be made by methods in themselves known from cyanuric halides, such as cyanuric bromide or cyanuric chloride, for example, by reacting one molecular proportion of cyanuric chloride with one molecular proportion of a reactive organic mercapto or hydroxyl compound, for example, a phenyl or an alcohol, one molecular proportion of ammonia or one molecular proportion of an organic amine having no dyestuff character which is at most a secondary amine and is preferably a primary amine, and which contains at most 10 carbon atoms and contains as the sole salt-forming group or groups a sulfonic acid group and/or carboxylic acid group. As such compounds there may be mentioned, for example, alphatic or aromatic mercapto or hydroxy compounds, and especially lower alcohols and phenols, and also methylamine, ethylamine, isopropylamine, methoxy ethylamine, methoxypropylamine, cyclohexylamine, dimethylamine, diethylamine, N-methyl-phenylamine, chlorethylamine, aniline, ethanolamine, piperidine, morpholine, amino-carbonic acid esters, amino-acetic acid ethyl ester, hydrazine, phenylhydrazine or ammonia, or amines containing groups imparting solubility in water, such as aminoethane sulfonic acid, N-methylaminoethane sulfonic acid, ortho-, meta- or para-aminobenzoic acid and their sulfonic acids, aminobenzene sulfonic acids such as ortho-, meta- or para-aminobenzene sulfonic acid, and also aniline-2:5-disulfonic acid.

The metalliferous azo dyestuffs to be condensed with the primary cyanuric chloride condensation products of the Formula 3 can be made by methods in themselves known, for example, from metallizable monoazo-dyestuffs which contain a single strongly acid group imparting solubility in water and, in addition to the group leading to the formation of metal complexes, an acylatable amino group, that is to say, a primary or secondary amino group, or a substituent convertible into such a group, and which monoazo-dyestuffs correspond to the formula (4)  $\left[ R-N=N-X \right]-NH-C_{n-1}H_{2n-1}$ in which R represents an etherified hydroxyl or mercapto group or a substituted amino group, X represents the radical of a coupling component, and $n$ represents the whole number 1, 2 or 3. For making such metallizable monoazo-dyestuffs an ortho-hydroxy- or ortho-carboxy-diazo-compound of the benzene series, especially a diazotized orthoaminophenol, such as a chloro- or nitro-ortho-aminophenol, an ortho-aminophenol sulfonic acid amide, ortho-aminophenolmonosulfonic acid, ortho-aminobenzoic acid or a nitro-, chloro-, methyl- or methoxy-ortho-aminophenol sulfonic acid, may be coupled with a coupling component capable of coupling in a position vicinal to a hydroxyl group, including an enolizable keto group, or an amino group, and which also contains an acylatable amino group or substituent convertible into such a group, when such a group or substituent is not present in the diazo-component. As such coupling components there may be mentioned, for example, resorcinol and dihydroxynaphthalenes, meta-aminophenol, 1-aryl-5-pyrazolones of which the aryl radical contains an amino group or a substituent convertible into such a group after the preparation of the dyestuff or after the metallization. As such pyrazolones there may be mentioned 1-(2'-, 3'- or 4'-aminophenyl)-3-methyl-5-pyrazolone, 1-(3'- or 4'-aminophenyl)-5-pyrazolone-3-carboxylic acid, and β-keto-carboxylic acid arylide containing acylatable amino groups in the arylide radical, and aminonaphthol monosulfonic acids such as 2-amino-8-hydroxynaphthalene-6-sulfonic acid, 2-N-methylamino-8-hydroxynaphthalene-6-sulfonic acid, 2-alkylamino-5-hydroxynaphthalene-7-sulfonic acid, 2-amino-5-hydroxynaphthalene-7-sulfonic acid, 2-(4'-aminobenzoylamino)-5-hydroxynaphthalene - 7-sulfonic acid, 2-(4'-acetylaminophenylamino) - 5-hydroxynaphthalene-7-sulfonic acid or 1-arylamino-6- or 7-hydroxynaphthalenes. Care must be taken in selecting the diazo- and coupling components used that the finished dyestuff contains only one strongly acid group imparting solubility in water. Useful dyestuffs are obtained by reducing nitro groups in ortho:ortho'-dioxy-monoazo-dyestuffs or ortho-carboxy-ortho'-hydroxy-monoazo-dyestuffs, or by hydrolyzing acylamino groups present in metallizable monoazo-dyestuffs, for example, by splitting off the acyl groups or by reducing the nitro groups in dyestuffs obtainable from ortho-hydroxy-diazo-compounds of the benzene series containing acylamino or nitro groups and coupling components free from acylatable amino groups, such as 4-acylamino-1-hydroxybenzenes, para-cresol, 2-acylamino-4-methyl-1-hydroxybenzenes, pyrazolones, 3-methyl-5-pyrazolone, 1-phenyl- or 1-chlorophenyl- or 1-nitroalkyl- or alkoxyphenyl-3-methyl-5-pyrazolone, acetoacetic acid amides and hydroxy- and/or amino-naphthalenes, 1-acylamino-6- or -7-hydroxynaphthalenes of which the acyl radical is that of a carboxylic acid, carbamic acid or sulfonic acid, 2-acetylamino-6-hydroxynaphthalene-8-sulfonic acid, β-naphthylamine, 2-aminonaphthalene-4- or -5- or -6- or -7-sulfonic acid, 1-aminonaphthalene-4- or -5-sulfonic acid. The hydrolysis or reduction may be carried out during or after metallization of the dyestuff.

The conversion of the dyestuffs obtained from the foregoing components into the complex metal compounds used as starting materials in the process of this invention may be carried out while the dyestuffs are in the coupling mixture.

The treatment with the agent yielding chromium or cobalt is performed according to the invention in a manner such that a chromiferous or cobaltiferous dyestuff respectively is formed that contains two monoazo dyestuff molecules bound in complex union to one atom of chromium or cobalt respectively. It is, therefore, of advantage to perform the metallization with an agent yielding chromium or cobalt and by a method that is known to produce complex chromium or cobalt compounds of this composition. In general it is advisable to use for every molecule of dyestuff less than one atom, and preferably about ½ atomic proportion, of chromium or cobalt and/or to perform the metallization in a weakly acid to alkaline medium. The present process is thus most advantageously performed with a chromium or cobalt compound that is stable in an alkaline medium, such as complex chromium or cobalt compounds of aliphatic hydroxycarboxylic acids or dicarboxylic acids, or complex chromium or cobalt compounds of aromatic ortho-hydroxycarboxylic acids. As examples of aliphatic hydroxycarboxylic acids and dicarboxylic acids respectively may be mentioned, inter alia, lactic acid, glycolic acid, citric acid and above all tartaric acid; from among aromatic ortho-hydrocarboxylic acids may be mentioned, for example, those of the benzene series such as 4-, 5- or 6-methyl-1-hydroxybenzene-2-carboxylic acid and above all the unsubstituted 1-hydroxybenzene-2-carboxylic acid. Alternatively, the cobalt-yielding agent used may be a simple compound of divalent cobalt, such as cobalt acetate or sulfate, or, if desired, cobalt hydroxide.

It is of advantage to convert the dyestuffs into the complex chromium or cobalt compound at an elevated temperature, under atmospheric or superatmospheric pressure, for example, at the boiling temperature of the reaction mixture, if desired in the presence of suitable additives, for example in the presence of a salt of an organic acid, of a base, of an organic solvent or of another agent that promotes the formation of complexes.

The metallization process described above may be applied, for example, to a unitary dyestuff, though it is also possible, and in many cases advantageous (inter alia, for example, for producing different shades), to metallise a mixture of two different metallizable monoazo dyestuffs of the specified kind. In such a case it is possible, though by no means necessary, for both dyestuffs contained in the mixture to be ortho:ortho'-dihydroxymonoazo dyestuffs. A mixture containing, for example, an ortho:ortho'-dihydroxymonoazo dyestuff and an ortho-hydroxyortho'-aminomonoazo dyestuff or an ortho-carboxy-ortho'-hydroxymonoazo dyestuff can likewise be subjected to corresponding metallization.

The metalliferous parent dyestuffs of Formula 4 can alternatively be made by metallization and simultaneous hydrolysis of the appropriate ortho:ortho'-dihydroxymonoazo or ortho-carboxy-ortho'-hydroxymonoazo dyestuffs which contain acylamino groups and a single, strongly acidic group imparting solubility in water, or by subsequent reduction of the nitro groups of complex metal compounds of appropriate nitrated monazo dyestuffs.

The condensation according to the present invention of the resulting complex metal compounds of monoazo dyestuffs with cyanuric chloride or with the dihalogeno-triazine compounds of Formula 2 is advantageously performed in the presence of an acid acceptor such as sodium acetate, sodium hydroxide or sodium carbonate and under conditions that ensure that a single mobile halogen atom per triazine nucleus remains in the finished product.

The condensation with the specified 2:4-dihalogeno-1:3:5-triazines, for example the halogeno-triazine compounds of Formula 3, can be performed according to a modification of the present process prior to the metallization of the dyestuff, if the dyestuff used is so easy to metallize that the last halogen atom of the metal-free dyestuff condensate is not attacked.

The dyestuffs obtained by the present process and its modification are new; they are valuable dyestuffs suitable for dyeing and printing a wide variety of materials such as wool, silk and nylon, and more especially poly-hydroxylated fibrous materials such as cellulosic materials which may be synthetic fibers, for example of regenerated cellulose, or natural materials, for example cellulose, linen or above all cotton. It is recommended to use the dyestuffs containing monochloro-triazine residues above all in the printing and pad-dyeing processes in which the dyestuff is applied to the material to be dyed by printing or padding and fixed thereon with the aid of an acid acceptor and, if desired, with the application of heat, for example by steaming.

The dyestuffs prepared by the present process are advantageously isolated at a low temperature by salting out and filtration. The filtered dye can be dried, if desired after having been mixed with an extender; the drying is preferably carried out at not too high a temperature and under diminished pressure. By subjecting the whole of the manufacturing mixture to spray drying it is in some cases possible to manufacture dry preparations directly, that is to say without intermediate isolation of the dyestuff. By this method new, valuable dry preparations are obtained which are suitable for making stock solutions or dyebaths, if desired also printing pastes.

The dyeings obtained with the new dyestuffs on cellulosic fibers are as a rule distinguished by good fastness to light and above all by outstanding fastness to washing.

Unless otherwise indicated, parts and percentages in the following examples are by weight.

Example 1

44.6 parts of the monoazo dyestuff obtained by coupling 19.75 parts of 1-acetylamino-7-naphthol with 23.4 parts of diazotized 2-amino-1-hydroxy-6-nitrobenzene-4-sulfonic acid are neutralized in 700 parts of water, mixed with 50 parts of 2 N-sodium hydroxide solution and 120 parts of a chromesalicylate solution containing 2.8% of chromium, and the mixture is refluxed for 3 hours. The resulting solution of the 1:2-chromium complex compound formed is then mixed at 35 to 40° C. with 11.8 parts of calcined sodium sulfide dissolved in 100 parts of water. The reduction is complete after stirring for 5 to 6 hours at 40 to 45° C. After cooling, the chromium complex compound formed is isolated by addition of sodium chloride and slight acidification with acetic acid.

17.6 parts of this chromiferous dyestuff are dissolved in 150 parts of water containing a little sodium carbonate. The solution is rendered neutral and poured into a freshly prepared suspension of 7.4 parts of cyanuric chloride in 50 parts of ice and 50 parts of water. The liberated hydrochloric acid is continuously neutralized with N-sodium hydroxide solution in a manner such as to keep the reaction mixture at a constant pH of 6 to 6.5.

After the condensation, 10 parts by volume of ammonia solution of 20% strength are added, the whole is heated for 2 hours at 35 to 40° C., the aminochlorotriazine dyestuff formed is salted out with sodium chloride, filtered off and dried. It forms a black powder which dyes cellulose by the method described below strong, neutral grey tints having excellent fastness to washing and good fastness to light.

Dyestuffs having similar properties are obtained by using 1-aminobenzene-3- or -4-sulfonic acid instead of ammonia.

*Dyeing method.*—A solution of 1 part of the dyestuff in 100 parts of water to impregnate a cotton fabric on the padder at 80° C., the surplus liquid then being squeezed off until the weight of the fabric shows an increase of 75%. The material thus impregnated is then dried and impregnated at room temperature with a solution containing per liter 10 grams of sodium hydroxide and 300 grams of sodium chloride, squeezed to a weight increase of 75%, and steamed for 60 seconds at 100 to 101° C., rinsed, soaped for ¼ hour in a 0.3% solution of a non-ionic detergent, rinsed and dried. A grey dyeing results which is fixed fast to boiling.

Example 2

44.6 parts of the monoazo dyestuff obtained by alkaline coupling of 28.1 parts of 2-acetylamino-6-hydroxynaphthalene-8-sulfonic acid with 15.4 parts of diazotized 2-amino-1-hydroxy-4-nitrobenzene are dissolved in 500 parts of water containing 5.3 parts of sodium carbonate, a solution of 17.7 parts of calcined sodium sulfide in 100 parts of water is added, and the mixture is stirred for 5–6 hours at 40 to 45° C. After the reduction the reaction mixture is filtered until the filtrate is clear, whereupon it is neutralized.

To form the chromium complex compound the above solution is mixed with 50 parts of 2 N-sodium carbonate solution and 120 parts of chromesalicylate solution containing 2.8% of chromium, and the mixture is refluxed for 3 hours. The resulting solution of the 1:2-chromium complex compound is allowed to cool, and the dyestuff is isolated from it by adding sodium chloride and slight acidification with acetic acid.

17.6 parts of this chromiferous dyestuff are dissolved in 300 parts of water containing a little sodium carbonate, the solution is rendered neutral and cooled to 0° C., and a solution of 7.4 parts of cyanuric chloride in 50 parts of acetone is added. The liberated hydrochloric acid is continuously neutralized with N-sodium hydroxide solution in a manner such as to keep the pH of the reaction mixture constant at 6–6.5.

After the primary condensation at 0 to 5° C. 10 parts of ammonia solution of 20% strength are added, the whole is heated for 2 hours at 35 to 40° C., and the dyestuff formed is isolated with sodium chloride, filtered off and dried in vacuo at 60 to 70° C. It forms a black powder and dyes cellulose by the method described in Example 1 strong bluish grey tints of excellent fastness to washing and very good fastness to light.

The corresponding cobalt complex compound is obtained in the following manner: The aminomonoazo dyestuff obtained in the form of a neutral solution according to the 1st paragraph of Example 2 is mixed with 100 parts of 2 N-sodium hydroxide solution, heated to 70° C., 135 parts of a cobalt sulfate solution containing 3.1% of cobalt are added, and the mixture is stirred for ½ hour at 70 to 80° C. The resulting solution is allowed to cool, and the 1:2-cobalt complex compound is isolated therefrom with sodium chloride and by slight acidification with acetic acid. The further procedure is as described in the third and fourth paragraphs. The dyestuff thus obtained dyes cotton by the method described in Example 1 greyish violet tints which are fast to washing.

Example 3

18.4 parts of cyanuric chloride freshly precipitated from acetone are suspended in 150 parts of ice water. A solution, adjusted to pH=7, of 25.3 parts of 1-aminobenzene-2:5-disulfonic acid in 150 parts of water is added, and the reaction mixture is stirred at 0 to 5° C. until complete dissolution is reached, the liberated hydrochloric acid being continuously neutralized with 100 parts of N-sodium hydroxide solution in a manner such as to keep the pH of the reaction mixture constant at 6 to 7.

After the primary condensation, a neutral solution of 44.2 parts of the above-mentioned chromium complex (Example 2, 2nd paragraph) in 200 parts of water is added, and the reaction mixture is heated for 3 hours at 35 to 40° C. The liberated hydrochloric acid is continuously neutralized with N-sodium hydroxide solution in a manner such as to keep the pH of the reaction solution at 6 to 7. The dyestuff formed is salted out with sodium chloride, filtered off and dried in vacuo at 60 to 70° C. It forms a black powder and dyes cellulose by the dyeing method described in Example 1 bluish grey tints, of very good fastness to washing.

When in the manufacture of the primary condensation product 1-aminobenzene 2:5-disulfonic acid is replaced by 2-aminonaphthalene-4:8-disulfonic acid or 1-aminonaphthalene-3:6-disulfonic acid, dyestuffs with similar properties are obtained.

The following table lists further dyestuffs which can be made by the method described in Examples 1–3 by taking a monoazo dyestuff obtainable from a diazo compound (column I) and a coupling compound (column II) reducing the nitro group, and converting it into the complex metal compound. (The relative metal is mentioned in column III.) The complex metal compounds are condensed to primary condensation products with cyanuric chloride, and with the compound mentioned in column IV. The tints obtained with the corresponding metalliferous dyestuffs on cotton are given in the last column.

| Ex. No. | I. Diazo component | II. Coupling component | Me | IV | Tint |
|---|---|---|---|---|---|
| 1 | 2-amino-1-hydroxy-6-nitrobenzene-4-sulfonic acid. | 1-acetylamino-6-hydroxy-naphthalene. | Cr | Ammonia | Grey violet. |
| 2 | ___do___ | ___do___ | Cr | $H_2N-\langle\rangle-SO_3H$ | Do. |
| 3 | ___do___ | 1-[2'-chloro-6'-methyl]-phenyl-3-methyl-5-pyrazolone. | Cr | $H_2N-\langle\rangle-SO_3H$ | Orange brown. |
| 4 | ___do___ | 1-hydroxy-4-methylbenzene | Cr | Ammonia | Violet brown. |
| 5 | ___do___ | ___do___ | Co | ___do___ | Reddish brown. |
| 6 | ___do___ | β-Naphthol | Cr | ___do___ | Violet grey. |
| 7 | ___do___ | ___do___ | Cr | $H_2N-\langle\rangle-SO_3H$ | Do. |
| 8 | ___do___ | ___do___ | Co | Ammonia | Brownish claret. |
| 9 | ___do___ | ___do___ | Co | $H_2N-\langle\rangle$ with $SO_3H$ | Do. |
| 10 | ___do___ | β-Naphthylamine | Cr | Ammonia | Brownish grey. |
| 11 | ___do___ | ___do___ | Co | $H_2N-\langle\rangle$ with $SO_2H$ above and $SO_2H$ below | Grey olive. |
| 12 | ___do___ | 3:4-dimethyl-1-hydroxybenzene | Co | $H_2N-\langle\rangle-SO_3H$ with COOH | Violet brown. |
| 13 | ___do___ | ___do___ | Co | $H_2NCH_2CH_2OH$ | Reddish brown. |
| 14 | ___do___ | 4-isopropyl-1-hydroxybenzene | Cr | $H_2N-\langle\rangle$ with $SO_3H$ | Violet brown. |
| 15 | ___do___ | ___do___ | Co | $H_2N-\langle\rangle$ with $SO_3H$ and $SO_3H$ | Reddish brown. |
| 16 | 5-nitro-4-chloro-2-amino-1-hydroxybenzene. | 2-acetylamino-6-hydroxynaphthalene-8-sulfonic acid. | Cr | $H_2N-\langle\rangle$ with COOH | Bluish grey. |
| 17 | ___do___ | ___do___ | Co | $H_2N-\langle\rangle-SO_3H$ | Violet grey. |
| 18 | 6-chloro-4-nitro-2-amino-1-hydroxybenzene. | 1-[3'-sulfophenyl]-3-methyl-5-pyrazolone methyl. | Cr | $H_2N-\langle\rangle$ with $SO_3H$ | Brownish red. |
| 19 | ___do___ | ___do___ | Co | $H_2N-\langle\rangle$ with $SO_3H$ | Brown. |
| 20 | 2-amino-5-nitrobenzene-1-carboxylic acid. | ___do___ | Cr | Ammonia | Yellow orange. |
| 21 | ___do___ | ___do___ | Cr | $H_2N-\langle\rangle$ with $SO_3H$ | Do. |

Example 4

43.4 parts of the monoazo dyestuff obtained by coupling diazotized 1-hydroxy-2-amino-6-acetylaminobenzene-4-sulfonic acid in an alkaline medium with 1 phenyl-3-methyl-5-pyrazolone are heated for 2 hours at 90 to 95° C. in 1000 parts of sodium hydroxide solution of 4% strength to hydrolyse the acetylamino group. After cooling, the aminoazo dyestuff is precipitated with hydrochloric acid and sodium chloride and filtered off.

To prepare the 2:1-cobalt compound the dyestuff is dissolved in 200 parts of water and 100 parts of 2 N-sodium hydroxide solution and heated at 70° C., 100 parts of a cobalt sulfate solution containing 3.25% of cobalt are added, and cobalting is performed for ½ hour at 70 to 80° C.

To manufacture the monochloro-triazine derivative the dyestuff solution of the cobalt complex compound is cooled to 0° C. and adjusted to pH=7. A solution of 18.5 parts of cyanuric chloride in a little acetone is vigorously stirred in at 0 to 5° C., and the pH value is kept at 7 by adding dropwise 50 parts of 2 N-sodium hydroxide solution.

To replace the second chlorine atom of the cyanuric chloride by an amino group the reaction mixture is treated with 120 parts of 2 N-ammonia solution and stirred for 3 hours at 35 to 40° C. The dyestuff is salted out with sodium chloride and dried in vacuo at 60° C. A brown powder is obtained which dyes cellulosic fibres by the method described in Example 1 yellowish brown tints having good fastness to washing and light.

A dyestuff having similar properties is obtained when the primary cyanuric chloride condensation product of the abovementioned cobalt complex is substituted, instead of with ammonia, with 1-aminobenzene-3- or -4-sulfonic acid or with 1-aminobenzene-2:5-disulfonic acid or with 1-aminobenzene-2-sulfonic acid. The procedure preferably adopted in the case of the two last-mentioned compounds is that described in the last paragraph of Example 3.

The following table contains further dyestuffs obtainable from the diazo and coupling components shown in columns I and II, which, by the method described in Example 4, after hydrolysis of the acylamino group and conversion into the corresponding complex metal compounds (for example according to the 2nd paragraph of Example 2 or to the second paragraph of Example 4) are condensed with cyanuric chloride and the compounds listed in column IV. In the last column are shown the tints obtained with the corresponding metalliferous dyestuffs on cotton.

| Ex. No. | I. Diazo component | II. Coupling component | Me | IV | Tint |
|---|---|---|---|---|---|
| 1 | 5-nitro-4-chloro-2-amino-1-hydroxybenzene. | 2-acetylamino-6-hydroxynaphthalene-8-sulfonic acid. | Cr | NH$_2$–CH$_2$CH$_2$–OH | Greenish grey. |
| 2 | ----do---- | ----do---- | Co | Ammonia | Bluish grey. |
| 3 | 4-chloro-2-amino-1-hydroxybenzene | ----do---- | Cr | H$_2$N–C$_6$H$_4$–SO$_3$H | Blue grey. |
| 4 | ----do---- | ----do---- | Co | H$_2$N–C$_6$H$_3$(COOH)–SO$_3$H | Violet grey. |
| 5 | 4-nitro-2-amino-1-hydroxybenzene-6-sulfonic acid. | 1-acetylamino-6-hydroxynaphthalene | Cr | Ammonia | Reddish violet. |
| 6 | 6-nitro-2-amino-1-hydroxybenzene-4-sulfonic acid. | 2-acetylamino-1-hydroxy-4-methylbenzene | Cr | ----do---- | Brown violet. |
| 7 | 4-nitro-2-amino-1-hydroxybenzene. | 2-acetylamino-6-hydroxynaphthalene-8-sulfonic acid. | Cr | Methylamine | Grey. |
| 8 | ----do---- | ----do---- | Cr | H$_2$N–C$_6$H$_4$–SO$_3$H | Do. |
| 9 | ----do---- | ----do---- | Co | NH$_2$–CH$_2$CH$_2$–OH | Violet brown. |
| 10 | ----do---- | ----do---- | Co | H$_2$N–C$_6$H$_4$–SO$_3$H | Do. |
| 11 | 5-nitro-2-amino-hydroxybenzene | ----do---- | Co | H$_2$N–C$_6$H$_4$–SO$_3$H | Greenish grey. |
| 12 | ----do---- | ----do---- | Co | H$_2$N–C$_6$H$_4$–SO$_3$H | Grey. |
| 13 | 4:6-dinitro-2-amino-1-hydroxybenzene. | ----do---- | Cr | H$_2$N–CH$_3$ | Greenish grey. |
| 14 | ----do---- | ----do---- | Co | CH$_2$–NH$_2$ / CH$_2$CH$_2$–O–CH$_3$ | Grey. |
| 15 | 2-amino-1-hydroxy-6-acetylaminobenzene-4-sulfonic acid. | 1-aceto-acetylamino-2-methoxybenzene | Co | H$_2$N–C$_6$H$_4$–SO$_3$H | Brownish yellow. |
| 16 | 4:6-dinitro-2-amino-1-hydroxybenzene. | 2-acetylamino-6-hydroxynaphthalene-8-sulfonic acid. | Cr | Morpholine | Greenish grey. |
| 17 | 4-chloro-2-amino-hydroxybenzene | ----do---- | Cr | Ammonia | Bluish grey. |

Example 5

38.4 parts of the monoazo dyestuff obtained by coupling 21.9 parts of 1-[3'-aminophenyl]-5-pyrazolone-3-carboxylic acid with 15.4 parts of diazotized 2-amino-1-hydroxy-4-nitrobenzene in a medium containing sodium carbonate are dissolved in 500 parts of water with 100 parts of 2 N-sodium hydroxide solution; 135 parts of a cobalt sulfate solution containing 3.1% of cobalt are added, and the whole is stirred for ¾ hour at 80 to 85° C. The reaction solution is allowed to cool, and the 1:2-cobalt complex formed is precipitated from it by the addition of sodium chloride and slight acidification with acetic acid and then filtered off.

15.4 parts of this cobaltiferous dyestuff are dissolved in 300 parts of water containing some sodium carbonate, the solution is rendered neutral and then cooled to 0° C. A solution of 7.4 parts of cyanuric chloride in 50 parts of acetone is added, and the hydrochloric acid liberated by the condensation is neutralized in a manner such as to keep the pH value of the reaction mixture constant at 6 to 6.5.

After the primary condensation at 0 to 5° C., 10 parts of ammonia solution of 20% strength are added and the whole is heated for 2 hours at 30 to 40° C. The dyestuff formed is then salted out with sodium chloride, filtered and dried at 60 to 70° C. in vacuo. It forms a brown powder and dyes cellulose by the method described in Example 1 strong yellowish brown tints having outstanding fastness to light and washing.

In the following table are shown further diazo and coupling components which can be coupled as described in Example 4, then converted into the corresponding complex metal compounds (according to the 1st paragraph of Example 4 or the 2nd paragraph of Example 1) and condensed with cyanuric chloride and the compounds shown in column IV. The tints listed in the last column are those produced with the corresponding metalliferous dyestuffs on cotton.

| Ex. No. | I. Diazo Component | II. Coupling Component | III. Me | IV | Tint |
|---|---|---|---|---|---|
| 1 | 4-chloro-2-amino-1-hydroxybenzene | 2-amino-5-hydroxynaphthalene-7-sulfonic acid | Cr | Ammonia | Reddish navy blue. |
| 2 | ...do... | ...do... | Cr | $H_2N-\bigcirc-HO_3S$ | Do. |
| 3 | ...do... | ...do... | Co | $H_2N-\bigcirc-COOH$ | Violet brown. |
| 4 | 4-nitro-2-amino-1-hydroxybenzene | ...do... | Cr | Ammonia | Blackish grey. |
| 5 | ...do... | ...do... | Cr | $H_2N-\bigcirc-HO_3S$ | Do. |
| 6 | ...do... | ...do... | Co | $CH_2-NH_2$ \| $CH_2-O-CH_3$ | Brown violet. |
| 7 | ...do... | ...do... | Co | $H_2N-\bigcirc$ with $HO_3S$ and $SO_3H$ | Do. |
| 8 | 5-nitro-2-amino-1-hydroxybenzene | ...do... | Cr | Ammonia | Bluish grey. |
| 9 | ...do... | ...do... | Cr | $H_2N-\bigcirc$ $HO_3S$ | Do. |
| 10 | ...do... | ...do... | Co | $CH_2-NH_2$ \| $CH_2-OH$ | Grey. |
| 11 | ...do... | ...do... | Co | $H_2N-\bigcirc$ $HO_3S$ | Do. |
| 12 | ...do... | 2-amino-8-hydroxynaphthalene-6-sulfonic acid | Cr | Ammonia | Greenish grey. |
| 13 | ...do... | ...do... | Co | $CH_2-NH_2$ \| $CH_2-OH$ | Reddish grey. |
| 14 | 4-chloro-2-amino-1-hydroxybenzene | ...do... | Cr | $CH_2NH_2$ \| $CH_2CH_2-O-CH_3$ | Blue Grey. |
| 15 | ...do... | ...do... | Co | $H_2N-\bigcirc-SO_3H$ | Violet grey. |
| 16 | 4-nitro-6-chloro-2-amino-1-hydroxybenzene | 1-[3'-aminophenyl]-3-carboxy-5-pyrazolone | Cr | $H_2N-\bigcirc$ $HO_3S$ | Brown orange. |
| 17 | ...do... | ...do... | Co | $H_2N-\bigcirc$ $HO_3S$ | Yellowish brown. |
| 18 | 6-nitro-2-amino-1-hydroxybenzene-4-sulfonic acid | 1-[4'-aminophenyl-3]-methyl-5-pyrazolone | Cr | Ammonia | Orange. |
| 19 | ...do... | ...do... | Co | $H_2N-\bigcirc$ $HO_3S$ | Brown orange. |

Table—Continued

| Ex. No. | I. Diazo Component | II. Coupling Component | III. Me | IV | Tint |
|---|---|---|---|---|---|
| 20 | 4-nitro-2-amino-1-hydroxybenzene-6-sulfonic acid. | ___do___ | Cr | $H_2N-\langle\rangle-SO_3H$ | Yellow orange. |
| 21 | ___do___ | ___do___ | Co | $CH_2-NH_2$ / $CH_2-CH_2-O-CH_3$ | Yellowish brown. |
| 22 | 2-amino-1-carboxybenzene-4-sulfonic acid. | ___do___ | Cr | $H_2N-\langle\rangle$ (with $HO_3S$) | golden yellow. |
| 23 | 4-chloro-2-amino-1-hydroxybenzene | 1-[3'-aminophenyl]-3-carboxy-5-pyrazolone. | Cr | Ammonia | Brownish red. |
| 24 | ___do___ | ___do___ | Cr | $H_2N-\langle\rangle$ (with $HO_3S$) | Do. |
| 25 | 2-amino-1-hydroxybenzene-5-sulfonamide. | ___do___ | Cr | $H_2N-\langle\rangle$ (with COOH and $HO_3S$) | Reddish brown. |
| 26 | ___do___ | ___do___ | Cr | $H_2N-\langle\rangle$ (with $HO_3S$) | Do. |
| 27 | ___do___ | ___do___ | Co | $H_2N-\langle\rangle-SO_3H$ | Brownish red. |
| 28 | ___do___ | ___do___ | Co | $H_2N-\langle\rangle$ (with $SO_3H$ and $HO_3S$) | Do. |
| 29 | 2-amino-1-hydroxybenzene-4-sulfonamide. | ___do___ | Cr | Ammonia | Orange brown. |
| 30 | ___do___ | ___do___ | Co | $H_2N-\langle\rangle$ (with $SO_3H$ and $HO_3S$) | Yellowish brown. |
| 31 | 2-amino-1-hydroxy-4-nitrobenzene-6-sulfonic acid. | 1-[4'-aminophenyl]-3-methyl-5-pyrazolone. | Co | $H_2N-\langle\rangle$ (with $SO_3H$ and $HO_3S$) | Do. |
| 32 | ___do___ | ___do___ | Cr | $H_2N-\langle\rangle$ (with $SO_3H$) | Brown orange. |
| 33 | 2-aminobenzene-1-carboxylic acid | 1-[3'-aminophenyl]-3-carboxy-5-pyrazolone. | Cr | $NH_2$ / $CH_2CH_2OH$ | Yellow. |
| 34 | 4-chloro-2-amino-1-hydroxybenzene | 2-methylamino-8-hydroxynaphthalene-6-sulfonic acid. | Cr | Ammonia | Bluish grey. |
| 35 | 6-chloro-2-amino-1-hydroxybenzene-4-sulfonic acid. | 1-[4'-aminophenyl]-3-methyl-5-pyrazolone. | Cr | $H_2N-\langle\rangle$ (with $HO_3S$) | Orange brown. |
| 36 | ___do___ | ___do___ | Co | $H_2N-\langle\rangle$ (with $HO_3S$) | Yellow brown. |
| 37 | 2-amino-benzene-1-carboxylic acid | 2-amino-5-hydroxy-7-sulfonic acid | Cr | Ammonia | Violet brown. |
| 38 | ___do___ | ___do___ | Cr | $H_2N-\langle\rangle$ (with $SO_3H$ and $HO_3S$) | Do. |
| 39 | 4-chloro-2-amino-1-hydroxybenzene | 2-methylamino-5-hydroxynaphthalene-7-sulfonic acid. | Cr | Ammonia | Dark blue. |
| 40 | ___do___ | ___do___ | Co | ___do___ | Violet. |
| 41 | 4-nitro-2-amino-1-hydroxybenzene | 2-ethylamino-5-hydroxynaphthalene-7-sulfonic acid. | Cr | ___do___ | Grey blue. |
| 42 | ___do___ | ___do___ | Co | ___do___ | Brown violet. |
| 43 | 2-amino-1-hydroxybenzene-4-sulfonic acid | 1-[4'-aminophenyl]-3-methyl-5-pyrazolone. | Co | ___do___ | Yellowish brown. |

Example 6

18.4 parts of cyanuric chloride freshly precipitated from acetone are suspended in 150 parts of ice water. A solution, adjusted to pH=7, of 17.3 parts of 1-aminobenzene-2-sulfonic acid in 150 parts of water is added, and the reaction mixture is stirred at 0 to 5° C., the liberated hydrochloric acid being continuously neutralized with 100 parts of N-sodium hydroxide solution in a manner such as to keep the pH value of the reaction mixture constant at 6 to 7.

After the primary condensation, a neutralised solution of 41.1 parts of the cobaltiferous dyestuff described in the 1st paragraph of Example 5 in 200 parts of water is added and the whole is heated to and stirred for 2 hours at 35 to 40° C., the liberated hydrochloric acid being continuously neutralised in a manner such as to maintain the pH value of the solution constant at 6.5 to 7.

The dyestuff formed is washed with sodium chloride, filtered and dried in vacuo at 60 to 70° C. It is a brown powder which dyes cellulose by the method described in Example 1 yellowish brown tints which are fast to washing and light.

A dyestuff having similar properties is obtained when 25.3 parts of 1-aminobenzene-2:5-disulfonic acid are used instead of 1-aminobenzene-2-sulfonic acid.

Example 7

19.7 parts of the monoazo dyestuff obtained by coupling diazotized 4-chloro-2-amino-1-hydroxybenzene with 2-amino-5-hydroxynaphthalene-7-sulfonic acid in a medium rendered alkaline with sodium carbonate are dissolved in 250 parts of water and chromed with 120 parts of chromosalycilate solution containing 2.8% of chromium. The solution of the resulting 1:2 chromium complex compound is neutralized and added to a solution of 9 parts of 2-methoxy-4,6-dichloro-1,3,5-triazine in 80 parts of acetone, and heated at 35–40° C. for 3 hours. The liberated hydrochloric acid is neutralized by strewing in solid sodium bicarbonate at regular intervals in such manner that the pH value of the reaction mixture always remains between 6 and 6.5.

After that, sodium chloride is added to precipitate the resulting methoxy-chloro-triazine dyestuff, which is then filtered, and dried at 60–70° C. under reduced pressure. It is a dark powder which dyes cotton by the process of Example 1 reddish navy blue tints of excellent fastness to washing.

Example 8

19.7 parts of the monoazo dyestuff obtained by coupling diazotized 4-chloro-2-amino-1-hydroxybenzene with 2-amino-5-hydroxynaphthalene-7-sulfonic acid in a medium rendered alkaline with sodium carbonate, and 18.4 parts of the monoazo dyestuff from diazolized 1-hydroxy-2-amino-6-acetylamino-4-sulfonic acid and 1-phenyl-3-methyl-5-pyrazolone are dissolved in 500 parts by volume of water in the presence of 5.3 parts of anhydrous sodium carbonate at 70° C. 120 parts of a chrome-salicylate solution containing 2.8% of chromium are added, and the mixture is refluxed for 3 hours. The solution of the 1:2-chromium complex compound is cooled to 0° C., neutralized and mixed with a solution of 18.4 parts of cyanuric chloride in 100 parts of acetone. The liberated hydrochloric acid is continuously neutralised with 2 N-sodium hydroxide solution in a manner such as to keep the pH value of the reaction mixture constant at 6 to 6.5.

After the primary condensation, 20 parts of ammonia solution of 20% strength are added and the mixture is heated for 3 hours at 35–40° C., and the dyestuff formed is salted out with sodium chloride, filtered off and dried in vacuo at 60 to 70° C. It is a dark powder which is very readily soluble in water and dyes cellulose by the method described in Example 1 violetish brown tints which are fast to light and washing.

The corresponding cobalt complex compound is obtained as follows:

A mixture of the afore-mentioned two monoazo dyestuffs is dissolved in 500 parts of water with 100 parts of 2 N-sodium hydroxide solution at 70° C., 135 parts of a cobalt sulfate solution containing 3.1% of cobalt are added, and the whole is heated for ¾ hour at 80 to 85° C. The solution of the 1:2-cobalt complex compound is cooled to 0° C., neutralized and cyanurized and amidated as described above in the 2nd paragraph.

The dyestuff thus obtained dyes cotton by the method described in Example 1 reddish brown tints which are fast to boiling.

In columns I and II of the following table are shown further monoazo dyestuffs which are converted into the corresponding mixed complex compounds as described in the above example and condensed with cyanuric chloride and ammonia as described in the 2nd paragraph. The tints obtained with the corresponding metalliferous dyes on cotton are listed in column IV.

| Ex. No. | I | II | III | IV |
|---|---|---|---|---|
| 1 | [structure] | [structure] | Co | Brownish olive. |
| 2 | [structure] | [structure] | Co | Olive brown. |
| 3 | [structure] | [structure] | Cr | Brownish violet. |

Table—Continued

| Ex. No. | I | II | III | IV |
|---|---|---|---|---|
| 4 | 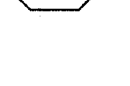 | 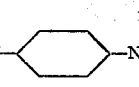 | Co | Reddish brown |
| 5 |  | 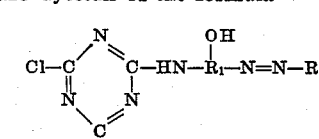 | Cr | Violetish brown. |
| 6 | 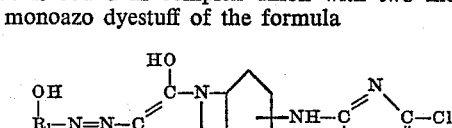 | 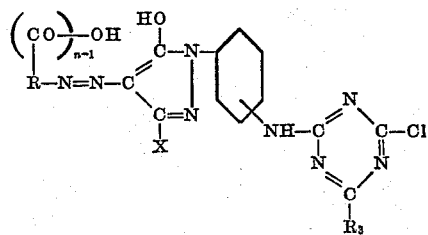 | Co | Yellowish brown. |

What is claimed is:

1. A complex metal compound selected from the group consisting of the complex chromium and cobalt compounds which contain in complex union with the metal two molecules of monoazo dyestuffs of the formula

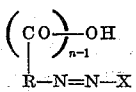

wherein $n$ represents a whole positive number up to and including two, R represents a benzene radical bound to the azo linkage in vicinal position to the

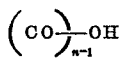

substituent and X represents the radical of a coupling component selected from the group consisting of a hydroxybenzene bound to the azo linkage in vicinal position to a hydroxyl group, a 5-pyrazolone bound to the azo linkage in 4-position, and β-ketocarboxylic acid amide bound to the azo linkage in α-position; R and X containing together a single sulfonic acid group and one of these two radicals being bound through an amino group in 6-position of a 1:3:5-triazine nucleus which bears in 2-position a chlorine atom and in 4-position a member selected from the group consisting of an $H_2N$-group, the radical of an aminobenzene carboxylic acid bound by its amino group and the radical of an amino benzene sulfonic acid bound by its amino group.

2. A complex chromium compound containing one atom of chromium bound in complex union with two molecules of monoazo dyestuffs of the formula wherein $n$ represents a whole positive number up to and including two, R represents a benzene radical bound to the azo linkage in vicinal position to the substituent X represents a member selected from the group consisting of a carboxyl and a methyl group, and $R_3$ represents a member selected from the group consisting of an $H_2N$-group, the radical of an amino benzene carboxylic acid bound by its amino group and the radical of an aminobenzene sulfonic acid bound by its amino group.

3. A complex cobalt compound containing one atom of cobalt bound in complex union with two molecules of a monoazo dyestuff of the formula wherein $R_1$ is a benzene radical bound to the azo linkage in vicinal position to the OH substituent, $R_2$ represents the radical of a 5-pyrazolone radical bound to the azo linkage in 4-position and $R_3$ represents a member selected from the group consisting of an $H_2N$-group, the radical of an amino benzene carboxylic acid bound by its amino group and the radical of an aminobenzene sulfonic acid bound by its amino group, $R_1$ and $R_2$ containing together a single sulfonic acid group.

4. A complex cobalt compound containing one atom of cobalt bound in complex union with two molecules of a monoazo dyestuff of the formula wherein $R_1$ is the radical of a benzene sulfonic acid bound to the azo linkage in vicinal position to the hydroxyl, and $R_3$ represents a member selected from the group consisting of an $H_2N$-group, the radical of an aminobenzene carboxylic acid bound by its amino group and the radical of an aminobenzene sulfonic acid bound by its amino group.

5. The complex chromium compound which contains one atom of chromium in complex union with two molecules of the monoazo dyestuff.

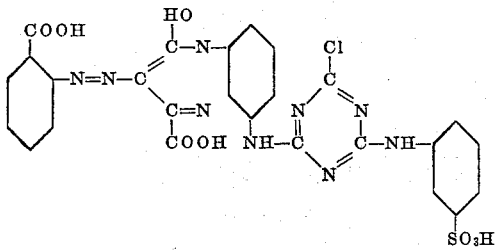

6. The complex chromium compound which contains one atom of chromium in complex union with two molecules of the monoazo dyestuff

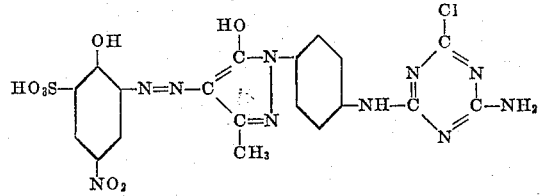

7. The complex cobalt compound which contains one atom of cobalt in complex union with two molecules of the monoazo dyestuff

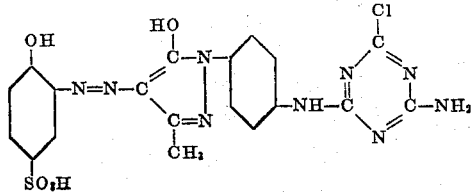

8. The complex cobalt compound which contains one atom of cobalt in complex union with two molecules of the monoazo dyestuff

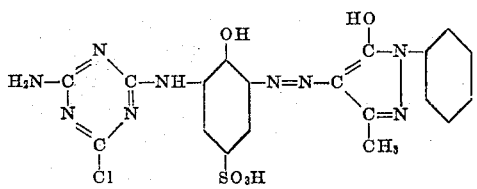

9. The complex cobalt compound which contains one atom of cobalt in complex union with two molecules of the monoazo dyestuff

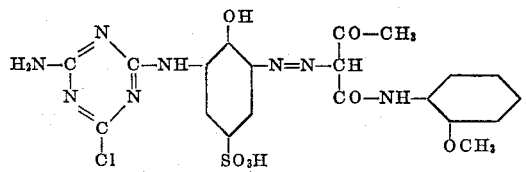

10. The complex cobalt compound which contains one atom of cobalt in complex union with two molecules of the monoazo dyestuff

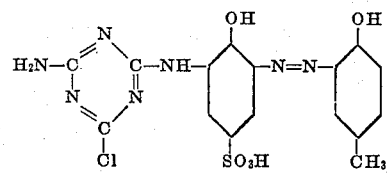

References Cited in the file of this patent

UNITED STATES PATENTS 1,779,298　　Straub et al. _____ Oct. 21, 1930

UNITED STATES PATENT OFFICE
CERTIFICATE OF CORRECTION

Patent No. 2,931,794                          April 5, 1960

Bernhard Ruetimeyer et al.

It is hereby certified that error appears in the printed specification of the above numbered patent requiring correction and that the said Letters Patent should read as corrected below.

Column 2, line 51, for "alphatic" read -- aliphatic --; column 5, line 34, for "-nitrobenezene-" read -- -nitrobenzene- --; columns 11 and 12, in the table, third column thereof, opposite "Ex. No. 18", for "1-[4'aminophenyl-3]-methyl-5-pyrazolone." read -- 1-[4'-aminophenyl]-3-methyl-5-pyrazolone. --; columns 13 and 14, in the table, third column thereof, opposite "Ex. No. 37", for "2-amino-5-hydroxy-7-sulfonic acid" read -- 2-amino-5-hydroxynaphthalene-7-sulfonic acid --; column 15, line 33, for "chromosalycilate" read -- chromosalicylate --; column 16, line 7, for "diazolized" read -- diazotized --; column 18, lines 65 to 70, the left-hand portion of the formula should appear as shown below instead of as in the patent:

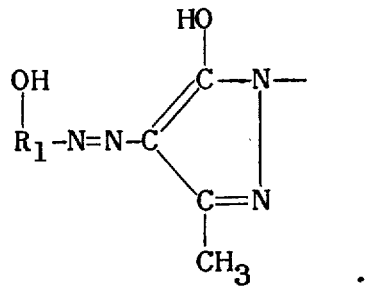

column 19, lines 8 to 14, the left-hand portion of the formula should appear as shown below instead of as in the patent:

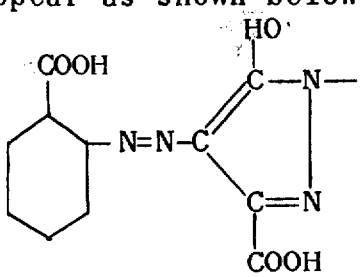

Signed and sealed this 11th day of October 1960.

(SEAL)

Attest:

KARL H. AXLINE                                  ROBERT C. WATSON

Attesting Officer                                 Commissioner of Patents